US009553516B2

(12) United States Patent
Lavieville

(10) Patent No.: US 9,553,516 B2
(45) Date of Patent: *Jan. 24, 2017

(54) MULTI-LEVEL POWER CONVERTER

(71) Applicant: Schneider Toshiba Inverter Europe SAS, Pacy sur Eure (FR)

(72) Inventor: Jean-Paul Lavieville, Saint Lambert des Bois (FR)

(73) Assignee: SCHNEIDER TOSHIBA INVERTER EUROPE SAS, Pacy sur Eure (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/635,337

(22) Filed: Mar. 2, 2015

(65) Prior Publication Data
US 2015/0288284 A1 Oct. 8, 2015

(30) Foreign Application Priority Data

Apr. 3, 2014 (FR) .................................. 14 52963

(51) Int. Cl.
 H02M 5/42 (2006.01)
 H02M 3/158 (2006.01)
 H02M 7/487 (2007.01)
(52) U.S. Cl.
 CPC ............... *H02M 3/158* (2013.01); *H02M 5/42* (2013.01); *H02M 7/487* (2013.01)
(58) Field of Classification Search
 CPC ......... H02M 7/537; H02M 7/483; H02P 27/14
 See application file for complete search history.

(56) References Cited

U.S. PATENT DOCUMENTS

| 2004/0095790 A1* | 5/2004 | Bakran | H02M 7/487 |
| | | | 363/132 |
| 2013/0051094 A1* | 2/2013 | Bendre | H02M 7/483 |
| | | | 363/71 |

(Continued)

FOREIGN PATENT DOCUMENTS

DE 10 2012 214 666 A1 2/2014

OTHER PUBLICATIONS

Multilevel Inverters: A Survey of Topologies, Controls, and Applications; José Rodríguez, Senior Member, IEEE, Jih-Sheng Lai, Senior Member, IEEE, and Fang Zheng Peng, Senior Member, IEEE;IEEE Transactions on Industrial Electronics, vol. 49, No. 4, Aug. 2002.*

(Continued)

*Primary Examiner* — Shawki S Ismail
*Assistant Examiner* — Muhammad S Islam
(74) *Attorney, Agent, or Firm* — Oblon, McClelland, Maier & Neustadt, L.L.P.

(57) ABSTRACT

This is a multi-level converter comprising one or more arms (B) to each be connected between a voltage source (VDC) and a current source (I). Each arm comprises two stages (E1, E2) in cascade, the first to be connected to the voltage source (VDC), the second to be connected to the current source (I). The first stage (Et1) comprises several elementary stages (E1n, ..., E12, E11) of rank one to n in cascade, the elementary stage (E11) of rank one being connected to the second stage (Et2) and the elementary stage (E1n) of rank n having to be connected to the voltage source (VDC). Each elementary stage (E1n) comprises a pair of identical cells of NPC type (Cen1, Cen2) in series, the connection being direct in the elementary stage of rank 1, the connection being made via n−1 capacitive cells ((Can(1), ..., Can(n−1)) for (Continued)

each elementary stage of rank greater than one, the second stage (Et2) comprising a floating capacitor cell (Ce10).

13 Claims, 14 Drawing Sheets

(56) References Cited

U.S. PATENT DOCUMENTS

2013/0094260 A1\* 4/2013 Martini ................ H02M 7/483
 363/97
2013/0249322 A1\* 9/2013 Zhang .................. H02M 7/483
 307/151

OTHER PUBLICATIONS

French Preliminary Search Report and Written Opinion issued Jan. 29, 2015, in Patent Application No. 1452963, filed Apr. 3, 2014 (with English Translation of Category of Cited Documents).

Zhiguo Pan, et al., "A Diode-Clamped Multilevel Converter with Reduced Number of Clamping Diodes", IEEE Applied Power Electronics Conference and Exposition, vol. 2, XP 010703326, Feb. 22, 2004, pp. 820-824.

Alian Chen, et al., "Research on Hybrid-Clamped Multilevel-Inverter Topologies", IEEE Transactions on Industrial Electronics, vol. 53, No. 6, XP 011151190, Dec. 2006, pp. 1898-1907.

\* cited by examiner

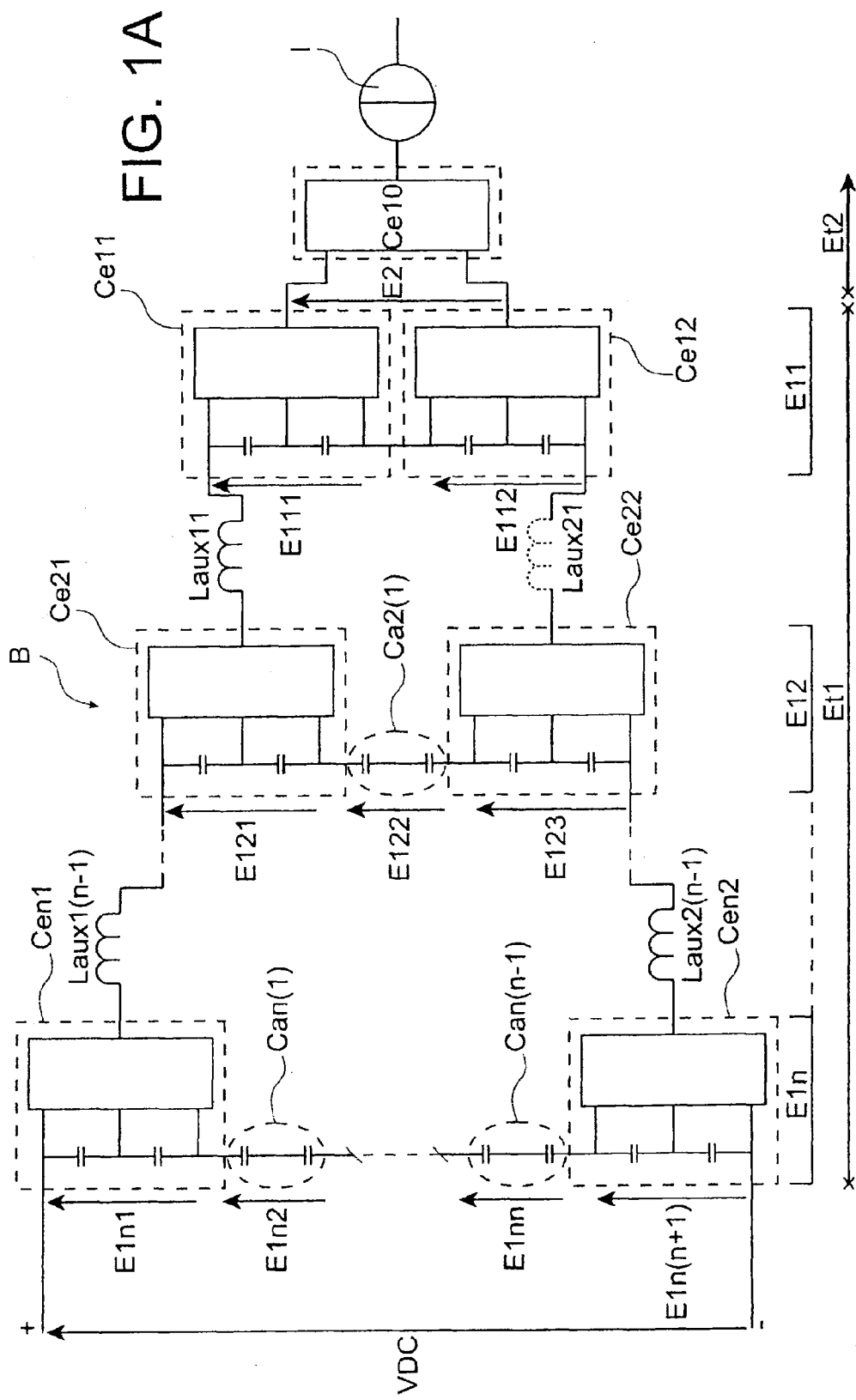

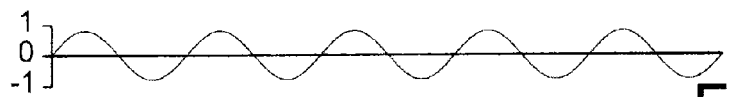
FIG. 6.00
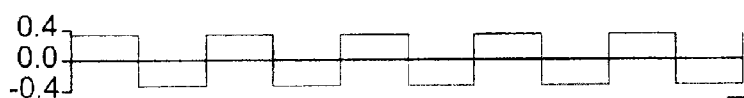
FIG. 6.01
FIG. 6.1
FIG. 6.2
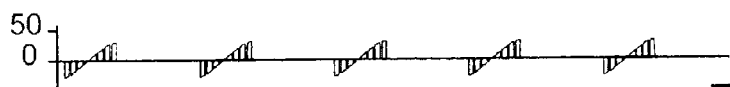
FIG. 6.3
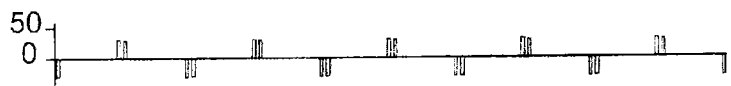
FIG. 6.4
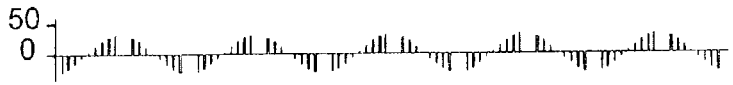
FIG. 6.5
FIG. 6.6
FIG. 6.7
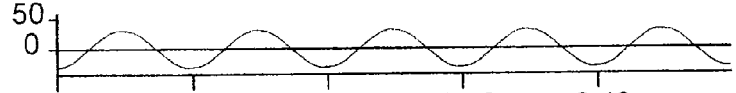
FIG. 6.8

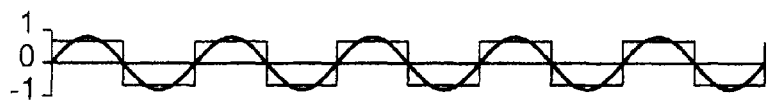
FIG. 6.02
FIG. 7.1
FIG. 7.2
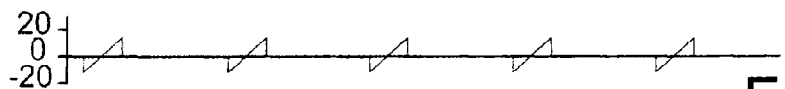
FIG. 7.3
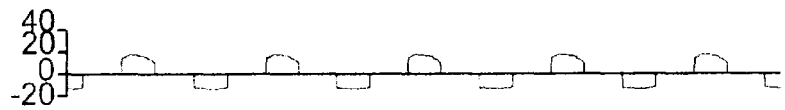
FIG. 7.4
FIG. 7.5
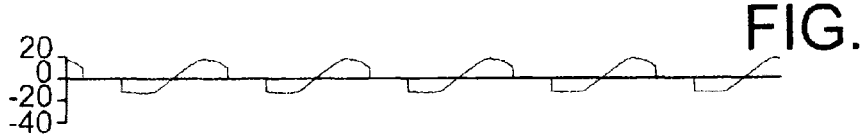
FIG. 7.6
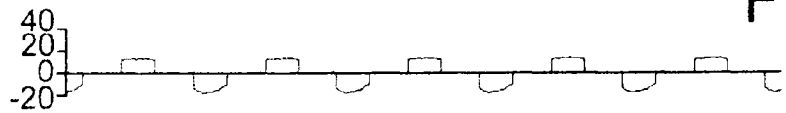
FIG. 7.7
FIG. 7.8
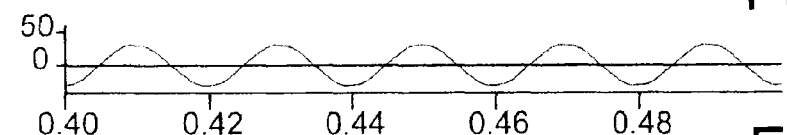
FIG. 7.9

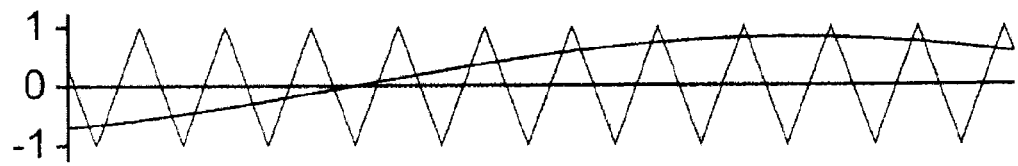
FIG. 6.03
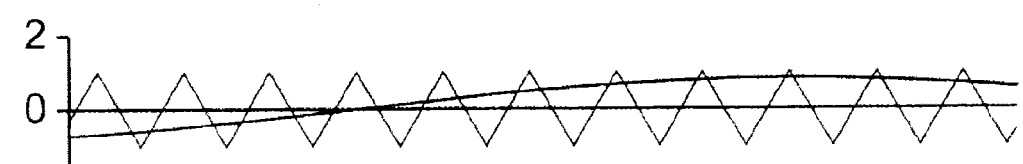
FIG. 6.04
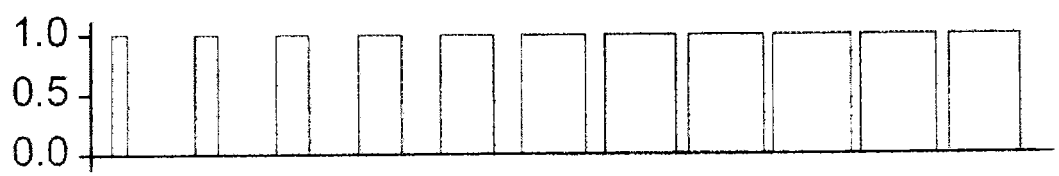
FIG. 8.1
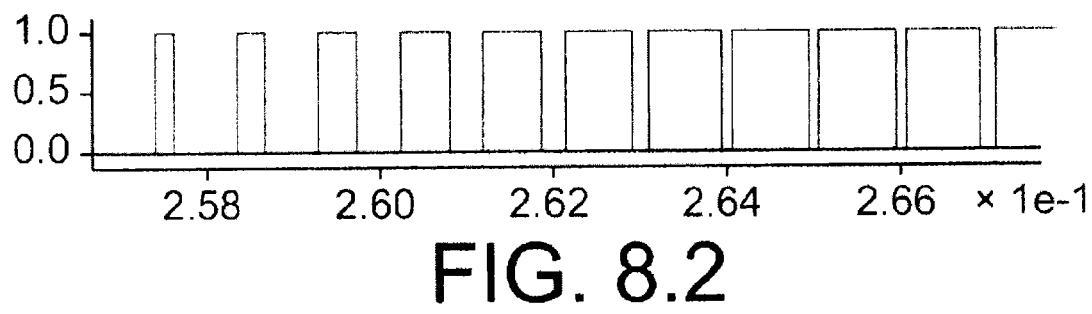
FIG. 8.2

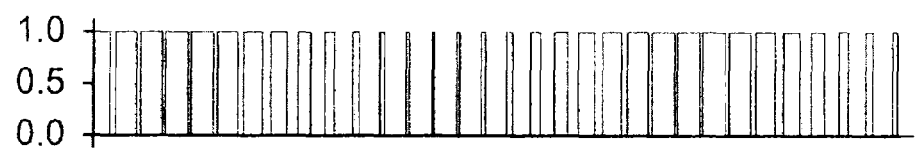
FIG. 8.6
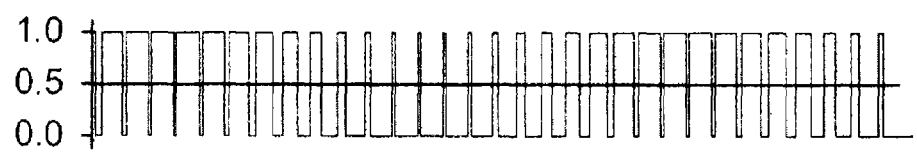
FIG. 8.7
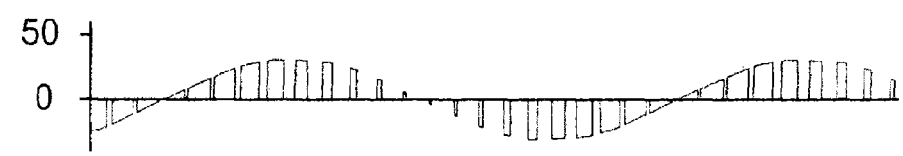
FIG. 8.3
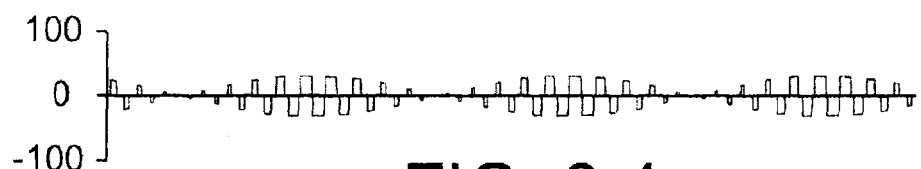
FIG. 8.4
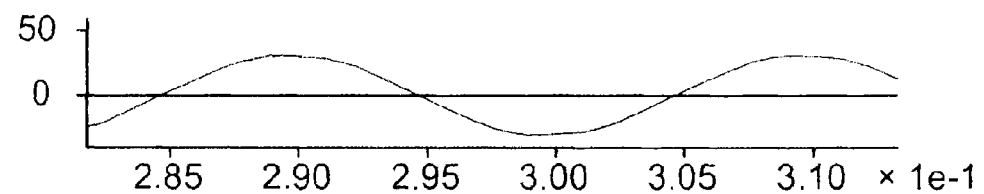
FIG. 8.5

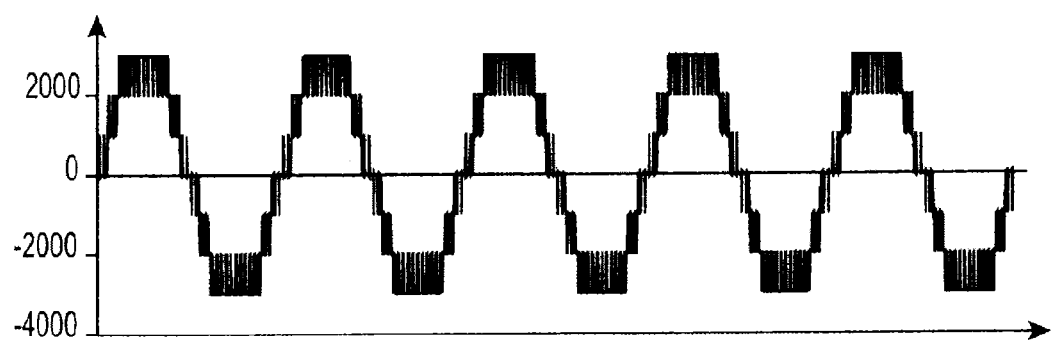
FIG. 9.1
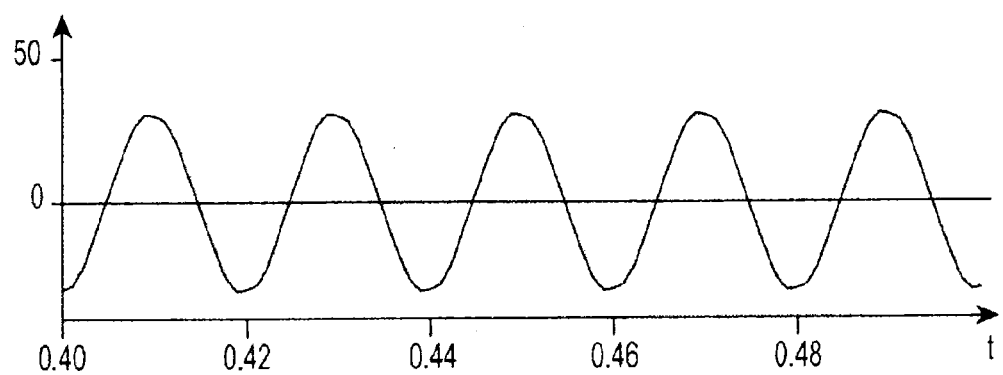
FIG. 9.2
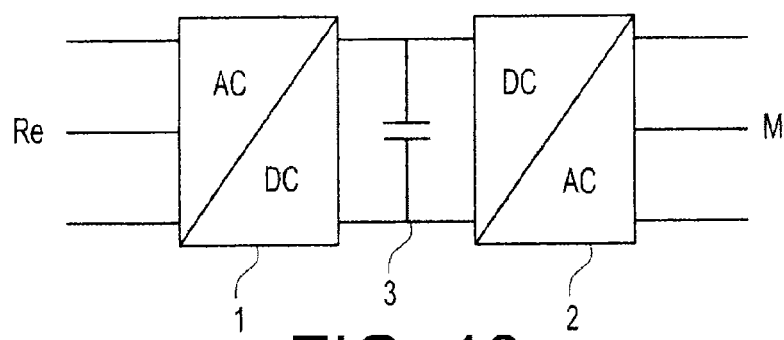
FIG. 10

MULTI-LEVEL POWER CONVERTER

TECHNICAL FIELD

The present invention relates to multi-level power converters more particularly intended to operate in the medium voltage range.

PRIOR ART

Known medium voltage power converters generally use semi-conductor switches placed in series to allow an increase in voltage. The major difficulty with placing these semi-conductor switches in series is of obtaining identical voltages across the terminals of all these semi-conductor switches at each instant. If transient or permanent overloads arise, the destruction of the semi-conductor switches may occur.

Techniques based on interleaving the controls of the switches and associated with the use of transformers have developed, and they make it possible to manage the distribution of the voltages and to reconstruct the waveforms. But transformers have a not insignificant cost and they prevent the realization of compact converters.

Another solution has arisen, namely the so-called NPC (neutral point clamped) topology. A cell of NPC type comprises two pairs of semi-conductor switches in series, two diodes in series connected on one side to the common point between the two switches of the first pair and on the other to the common point between the two switches of the second pair. A series of two capacitors, which is connected to the terminals of the assembly formed by the pairs of semi-conductor switches, is moreover found. The common point between the two diodes in series is linked to the common point between the two capacitors of the series.

This topology leads to a satisfactory waveform and to a reduction in the voltage constraints on the semi-conductor switches. On the other hand, imbalances in the voltage across the terminals of the capacitors may occur.

Improvements to the NPC original topology have occurred, by replacing the two diodes with a pair of semi-conductor switches. This topology is dubbed ANPC with 3 voltage levels.

Another improvement has arisen for increasing the acceptable voltage level by placing switches in series and by adding a capacitor. This topology is dubbed ANPC with 5 voltage levels. It has been developed by the company ABB. However, at present, it is limited to voltage levels of the order of 6.9 kV.

Another technique is based on the association of floating capacitor cells, also known as nested elementary cells. A voltage source can be linked to a current source via an arbitrary number of such elementary cells in series. Each elementary cell comprises two semi-conductor switches in series and an energy storage device such as a capacitor links together two neighbouring elementary cells in a ladder-like manner. However, this solution exhibits drawbacks related to the presence of the floating capacitor between two elementary cells. The greater the number of elementary cells, the greater the cost overhead related to the capacitors and the larger the quantity of energy stored in these capacitors.

Faced with the difficulties resulting from placing numerous semi-conductor switches in series so as to attain high voltage levels, it has been advocated to limit the number of switches in series, and to associate stages with cells nested in cascade, each stage comprising several nested elementary cells.

Thus in patent application US 2007/0025126, there is described a multi-level power converter comprising at least two arms configured with nested elementary cells linked together by capacitors.

In a first configuration, each arm comprises a cascade of 3 stages. These stages each have a different rank lying between one and three. Each stage comprises as many pairs of nested elementary cells as the rank of the stage. These pairs of nested elementary cells can take three voltage levels. The drawback of this first configuration is that it uses many switches and capacitors, thus making it expensive and very unreliable.

In a second configuration, each arm comprises a cascade of two stages, one of rank one and the other of rank two. Each stage comprises just as many triplets of nested elementary base cells. These triplets of elementary cells can take four voltage levels. In this second variant, the capacitors used will be charged with the different voltage levels depending on whether they belong to the first stage or to the second stage. This presents a limitation to standardization. Moreover, spurious inductances of the capacitors are all the higher the greater the voltage withstand. Overvoltages due to switching for the cells with largest voltage levels will limit the attraction of the setup.

ACCOUNT OF THE INVENTION

The aim of the present invention is to propose a multi-level converter able to work at voltage levels above those of the prior art, without needing either to resort to transformers or to increase the number of semi-conductor switches.

Another aim of the invention is to propose a multi-level converter which is less expensive and more reliable than the multi-level converters of the prior art, for a given voltage level.

Yet another aim of the invention is to propose a multi-level converter which uses batches of standard capacitors with limited voltage withstand.

An additional aim of the invention is to propose a multi-level converter which limits the occurrence of spurious inductances.

These aims are achieved by the associating of cells of NPC type and of capacitive cells.

More particularly, the present invention is a multi-level converter comprising one or more arms, configured to each be connected between a voltage source and a current source. The or each arm comprises two stages connected in cascade with a first stage intended to be connected to the voltage source and a second stage intended to be connected to the current source. The first stage comprises n elementary stages of rank one to n (n greater than one) connected in cascade, the elementary stage of rank one being connected to the second stage and the elementary stage of rank n being intended to be connected to the voltage source. Each elementary stage comprises a pair of identical cells of NPC type connected in series, the connection being direct in the elementary stage of rank one, the connection being made via n−1 capacitive cells for each elementary stage of rank n (n greater than one). The second stage comprises a cell of floating capacitor type.

In this multi-level converter, a capacitive cell comprises two energy storage devices arranged in series, these energy storage devices having one and the same energy storage capacity.

In an elementary stage, the cells of NPC type comprise a capacitive bridge with two energy storage devices having one and the same energy storage capacity. Each energy storage device of a capacitive cell of this elementary stage has one and the same energy storage capacity as one of the energy storage devices of a cell of NPC type.

Thus, all the energy storage devices of the first stage have one and the same energy storage capacity.

To comply with the connection rules as regard voltage source and current source, at least one of the cells of NPC type of an elementary stage is connected to a cell of NPC type of a neighbouring elementary stage via an inductance.

In the converter which is the subject of the invention, a cell of NPC type comprises a quadruplet of elementary switches arranged in series, two of which are in the extreme position and two of which are in the median position. An elementary switch in the extreme position and an elementary switch in the median position which are not directly linked are always in complementary states, one being enabled and the other being disabled, and these two elementary switches form an elementary switching cell.

A cell of NPC type possesses a conversion function which relates the voltage applied at the input of said cell to the voltage present at the output of said cell. The two elementary switching cells of said cell also each possess a conversion function. The conversion function of the cell of NPC type depends on the conversion functions of the two elementary switching cells.

Furthermore, the cells of NPC type of one and the same elementary stage have one and the same conversion function.

In the two cells of NPC type of one and the same elementary stage, the homologous elementary switches are controlled in an identical manner.

In the converter which is the subject of the invention, a cell of floating capacitor type comprises a quadruplet of elementary switches arranged in series, two of which are in the extreme position and two of which are in the median position. The two elementary switches in the extreme position are always in complementary states, the two elementary switches in the median position are always in complementary states, one being enabled and the other being disabled. The two elementary switches in the extreme position form a first elementary switching cell. The two elementary switches in the median position form a second elementary switching cell.

The elementary switches each comprise a controllable electronic power switch associated with a diode connected in antiparallel.

The energy storage devices are chosen from among a capacitor, a battery and a fuel cell.

The present invention also relates to a variable speed drive comprising a cascade with a converter thus characterized operating as an AC/DC rectifier and a converter thus characterized operating as a DC/AC inverter, linked together by their sides continuously by way of a voltage source.

BRIEF DESCRIPTION OF THE DRAWINGS

The present invention will be better understood on reading the description of exemplary embodiments given purely by way of wholly non-limiting indication while referring to the appended drawings in which:

FIG. 1A illustrates, in a very schematic manner, a multi-level converter arm which is the subject of the invention with a first stage and a second stage mounted in cascade, the first stage being a cascade of n elementary stages.

FIGS. 6 to 9 illustrate signals in the case of a converter, such as that of FIG. 4A, with a load 10 of RL type wired up between the node S and the node N3:

FIGS. 6.00 to 6.04 illustrate respectively the command signal Vref to be compared with the carrier Car3 for the control of the elementary switches T4u and T3u, with the carrier Car4 for the control of the elementary switches T5u and T6u, with the carrier Car1 for the control of the elementary switch T1, with the carrier Cart for the control of the elementary switch T2;

FIGS. 6.1 to 6.8 are timecharts corresponding to the first elementary stage E11: FIGS. 6.1 and 6.2 illustrate respectively the control signal for the elementary switches T3u, T4u; FIGS. 6.3 to 6.7 illustrate respectively the current flowing from the node N8 to the elementary switch T4u, the current flowing from the node N9 to the diodes D7 and D8, the current flowing from the node N10 to the elementary switches T3'u and T4l, the current flowing from the node N11 to the diodes D9 and D10, the current flowing from the node N12 to the elementary switch T3'l; FIG. 6.8 illustrates the output current from the arm and which powers the load 10;

FIGS. 7.1 to 7.9 are timecharts corresponding to the second elementary stage E12: FIGS. 7.1 and 7.2 illustrate respectively the control signal for the elementary switches T5u, T6u; FIGS. 7.3 to 7.8 illustrate respectively the current flowing from the terminal E+ having to be connected to the voltage source VDC to the elementary switch T6u, the current flowing from the node N1 to the diodes D1 and D2, the current flowing from the node N2 to the elementary switch T5'u, the current flowing from the node N4 to the elementary switch 161, the current flowing from the node N5 to the diodes D5 and D6, the current flowing from the terminal E− having to be connected to the voltage source VDC to the elementary switch T5'l; FIG. 7.9 illustrates the output current from the arm and which powers the load 10;

FIGS. 8.1 to 8.5 are timecharts corresponding to the second stage E2, FIGS. 8.1 and 8.2 illustrate respectively the control signal for the elementary switches T1, T2 with a first time base, the same as that of FIGS. 6.03 and 6.04; FIGS. 8.3 and 8.4 illustrate respectively the current flowing from the elementary switch T2 to the elementary switch T1 and the current flowing from the elementary switch T2 to the capacitor Cf; FIG. 8.5 illustrates the output current from the arm and which powers the load 10; FIGS. 8.6 and 8.7 again illustrate the control signal for the elementary switches T1, T2 with a second time base, the same as that of FIGS. 8.3 to 8.5;

FIGS. 9.1 and 9.2 illustrate respectively a timechart of the voltage Vs across the terminals of the load 10 and of the output current Is from the arm and which powers the load 10;

FIG. 10 shows an exemplary variable speed drive associating two multi-level converters which is the subject of the invention, one operating as a rectifier and the other as an inverter.

DETAILED ACCOUNT OF PARTICULAR EMBODIMENTS

Reference is made to FIG. 1A which shows an electrical diagram of an arm B of a multi-level converter which is the subject of the invention, in a general structure. It makes it possible to work at voltages from the medium voltage range up to about 13.8 kV.

It will be described initially in an example of a DC/AC converter arm.

Figure 1B:
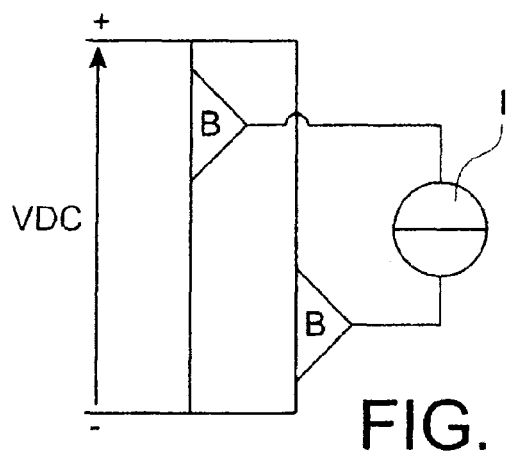
FIG. 1B is a single-phase multi-level converter comprising two arms which are similar to that of FIG. 1A.

The multi-level converter which is the subject of the invention, such as that illustrated in FIG. 1B, comprises one or more arms B similar to that represented in FIG. 1A. They are intended to each be wired up between two like electrical power supply sources, including a voltage source VDC and a current source I. Two arms are used in a single-phase converter. Three arms would be used in a three-phase converter.

The arm B of FIG. 1A is intended to be connected between the voltage source VDC and the current source I. The converter can then operate as a DC/AC converter (inverter) or else as an AC/DC converter (rectifier). In the case of a DC/AC converter, the current source is alternating and may be for example an electric motor, and the voltage source is direct and may be for example a direct current bus wired up to the output of a rectifier.

In the case of an AC/DC converter, the current source is alternating and may be for example the power supply network and the voltage source is direct and may be for example a capacitor or a battery.

The converter arm B comprises two stages Et1, Et2 connected together in cascade. The first stage Et1 or input stage is intended to be wired up to the voltage source VDC which is direct and the second stage Et2 or output stage is intended to be wired up to the current source I in the DC/AC converter configuration which is illustrated in FIGS. 1.

In an AC/DC converter configuration, the first stage Et1 or output stage would be wired up to a direct voltage source and the second stage Et2 or input stage would be wired up to an alternating current source. The input and the output of the converter are reversed when toggling from inverter operation to rectifier operation and vice versa.

The first stage Et1 is formed of n elementary stages E11, E12, . . . , E1n having a rank lying between 1 and n (n an integer greater than one) connected in cascade. The elementary stage E11 of rank 1 is connected to the second stage Et2. The elementary stage E1n of rank n is intended to be wired up to the voltage source VDC.

The second stage Et2 is formed of a floating capacitor type cell Ce10 to three voltage levels.

Each elementary stage E11, E12, . . . , E1n of the first stage Et1 comprises a pair of cells of NPC type (Ce11, Ce12), (Ce21, Ce22), . . . , (Cen1, Cen2) linked in series. The link between the two cells of NPC type (Ce11, Ce12), (Ce21, Ce22), . . . , (Cen1, Cen2) of one and the same elementary stage E11, E12, . . . , E1n of rank 1 to n is made by n−1 capacitive cells. For the elementary stage E11 of rank 1, the link between its two cells of NPC type Ce11, Ce12 is then direct. When n−1 is greater than one, there are n−1 capacitive cells which are connected in series. The capacitive cell of the elementary stage E12 of rank 2 is referenced Ca2(1) and by analogy those of the elementary stage En of rank n Can(1) to Can(n−1). Each capacitive cell comprises a pair of energy storage devices in series. The two energy storage devices of a capacitive cell have one and the same energy storage capacity. Moreover, all the energy storage devices of the capacitive cells of the first stage Et1 have one and the same energy storage value.

The energy storage devices used in the converter which is the subject of the invention, whether in the NPC type or floating capacitor cells or else in the capacitive cells, can be embodied by any device capable of storing electrical energy and of delivering it in the form of voltage. The energy storage devices can take the form of a capacitor, of a battery, of a fuel cell, etc.

Subsequently, for the sake of simplification, the reference VDC will represent both the voltage source and the voltage across the terminals of this voltage source.

It is appreciated that the voltage VDC has been split into n+1 associated voltages in series, two more extreme of which, dubbed E1n1 and E1n(n+1), are the input voltages of the cells of NPC type Cen1 and Cen2.

In inverter operation, a single voltage source VDC has been represented. Of course this voltage source VDC could consist of an assembly of n+1 independent elementary voltage sources.

Figure 3A:
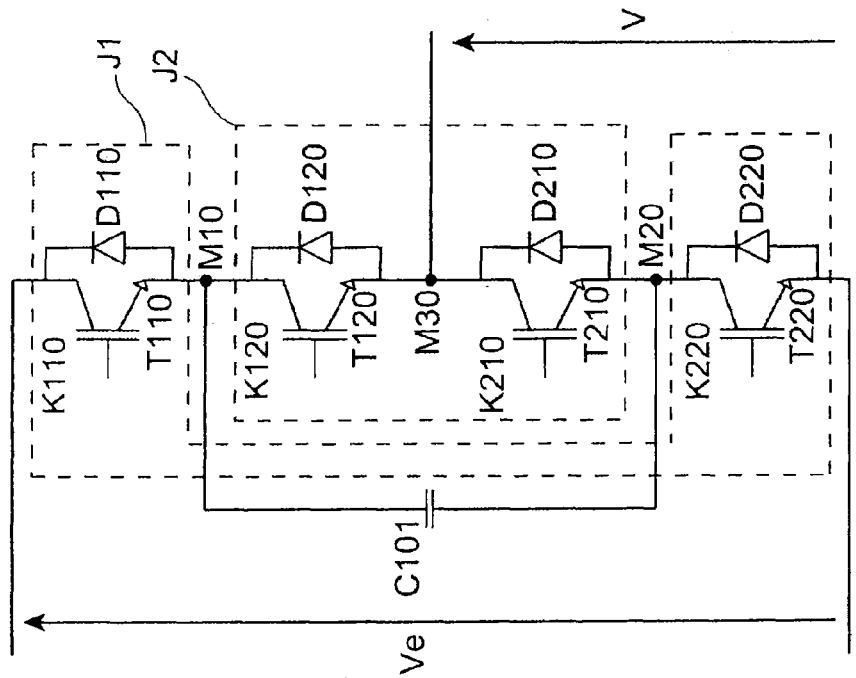
FIG. 3A shows a cell of type with floating capacitor with three voltage levels of the multi-level converter which is the subject of the invention and FIGS. 3B, 3C, 3D, 3E illustrate the flow of the current in this floating capacitor cell leading to the four states of the floating capacitor cell.

Each cell of NPC type comprises, as will be seen further on while referring to the description of FIG. 3A, an input capacitive divider bridge which manifests a voltage source. The voltages E1n1, E1n(n+1) are the voltages across the terminals of these capacitive bridges.

The voltages E1n2 to E1nn are floating voltages which are applied to the n−1 capacitive cells Can(1) to Can(n−1). These n−1 capacitive cells Can(1) to Can(n−1) form floating voltage sources.

In the same manner, the outputs of the cells of NPC type Cen1 and Cen2 of the elementary stage E1n are considered to be floating voltage sources.

The link between two neighbouring elementary stages is made between two respective cells of NPC type, via an inductor Laux11, Laux21, . . ., Laux1(n−1), Laux2(n−1). Each of these inductances can be regarded as a current source so as to comply with the rules for connection between voltage source and current source. The values of these two inductances are the same. On the other hand, two inductances which do not link two like stages do not necessarily have the same values. As a variant, it would be possible to use only a single inductance to link a first elementary stage and a second neighbouring elementary stage. Said inductance would be placed between a cell of NPC type of the first elementary stage and a cell of NPC type of the second neighbouring elementary stage. The other cell of NPC type of the first elementary stage would be linked directly to the other cell of NPC type of the second neighbouring elementary stage. It is in order to show this variant diagrammatically that the inductor Laux21 in FIG. 1A has been represented dotted. This signifies that it is optional. In this case, the value of the single inductance used would be the sum of the two inductances of the setup with two inductances.

At the level of the elementary stage E12 of rank 2, the outputs of the cells of NPC type Ce21 and Ce22 are connected via the inductors Laux11, Laux21 to two floating voltage sources consisting of the capacitive bridges of the two cells of NPC type Ce11, Ce12. These two voltage sources have a common point. The references E111, E112 correspond to the voltages across the terminals of these capacitive bridges.

The outputs of the cells of NPC type Ce11 and Ce12 embody a floating voltage source E2 which is applied as input to the floating capacitor type cell Ce10 of the second stage Et2. The structure and the operation of a floating capacitor type cell with three voltage levels are described while referring to FIGS. 3A to 3E.

The components of the nth elementary stage E1n are chosen in such a way that the input voltage VDC is split into n+1 equal input voltages applied to each of the two cells of NPC type Cen1, Cen2 and of the n−1 capacitive cells Can(1), . . . , Can(n−1). Thus VDC/n+1 is applied to each of the cells of the nth elementary stage.

It is possible to define a conversion function f associated with each cell of NPC or floating capacitor type, it relates the input voltage Ve applied to said cell to the voltage V present at the output of the same said cell.

$$V = f \cdot Ve/2 \text{ with } -1 \leq f \leq 1$$

In each elementary stage of the first stage, the two cells of NPC type are configured and controlled in such a way that their associated conversion functions are pairwise equal. In this way, the voltages applied at the input of each of the cells of the first stage, and also of the second stage, are equal to VDC/n+1. All the cells of NPC or floating capacitor type of the converter must support this voltage VDC/n+1. This addresses the initial objective of reducing the voltage constraints on the semi-conductor switches for a given DC voltage applied to the elementary stage of rank n of the first stage.

The structure of a cell of NPC type with three voltage levels will swiftly be described while referring to FIGS. 2A to 2D.

This cell of NPC type comprises a quadruplet of elementary switches mounted in series dubbed K11, K12, K21, K22. In this quadruplet, a first elementary switch K11 and a second elementary switch K22 are in the extreme position and a first elementary switch K12 and a second elementary switch K21 are in the median position, and the two elementary switches in the median position are linked directly to one another at the node M3. In the quadruplet, an elementary switch in the extreme position is linked directly to an elementary switch in the median position. This link makes it possible to define a first midpoint M1 between the first elementary switch K11 in the extreme position and the first elementary switch K12 in the median position and a second midpoint M2 between the second elementary switch K22 in the extreme position and the second elementary switch K21 in the median position.

The elementary switches K11, K12, K21, K22 are semiconductor switches and each comprise a controllable electronic power switch T11, T12, T21, T22, such as an IGBT (Insulated Gate Bipolar Transistor) power transistor associated with a diode D11, D12, D21, D22, connected in antiparallel. Instead of the IGBT transistors, other electronic power switches such as MOSFET transistors or the like are conceivable. In order not to overload the figures, the control means of the electronic power switches have not been represented.

A first diode D100 and a second diode D200 in series are connected between the first midpoint M1 and the second midpoint M2. The diode D100 has its cathode connected to the first midpoint M1, the diode D200 has its anode connected to the second midpoint M2. A capacitive divider bridge with a first energy storage device C100 and a second energy storage device C200 is connected to the extreme terminals of the quadruplet of elementary switches K11, K12, K21, K22. The two energy storage devices C100 and C200 have one and the same electrical energy storage capacity. The midpoint A between the two energy storage devices C100, C200 in series is linked to the midpoint B between the two diodes D100, D200 in series. The diode D100 has its anode connected to the midpoint B, the diode D200 has its cathode connected to the midpoint B.

Two switching functions are defined. The first switching function F1 is used for the control of a first elementary switching cell G1 comprising the first elementary switch K11 in the extreme position and the second elementary switch K21 in the median position. The second switching function F2 is used for the control of a second elementary switching cell G2 comprising the first elementary switch K12 in the median position and the second elementary switch K22 in the extreme position. The elementary switches of one and the same elementary switching cell G1 or G2 are not connected directly to one another and are always in complementary states, one being enabled and the other disabled.

The first input voltage V1 is applied across the terminals of the first energy storage device C100. The second input voltage V2 is applied across the terminals of the second energy storage device C200.

The output voltage V is taken between the midpoint A between the two energy storage devices C100, C200 and the node M3 common to the two elementary switches K12, K21 in the median position.

| State | K11 | K21 | F1 G1 | K12 | K22 | F2 G2 | V |
|---|---|---|---|---|---|---|---|
| 1 | enabled | disabled | 1 | enabled | disabled | 1 | V1 |
| 2 | disabled | enabled | 0 | enabled | disabled | 1 | 0 |
| 3 | disabled | enabled | 0 | disabled | enabled | 0 | −V2 |

Figure 2A:
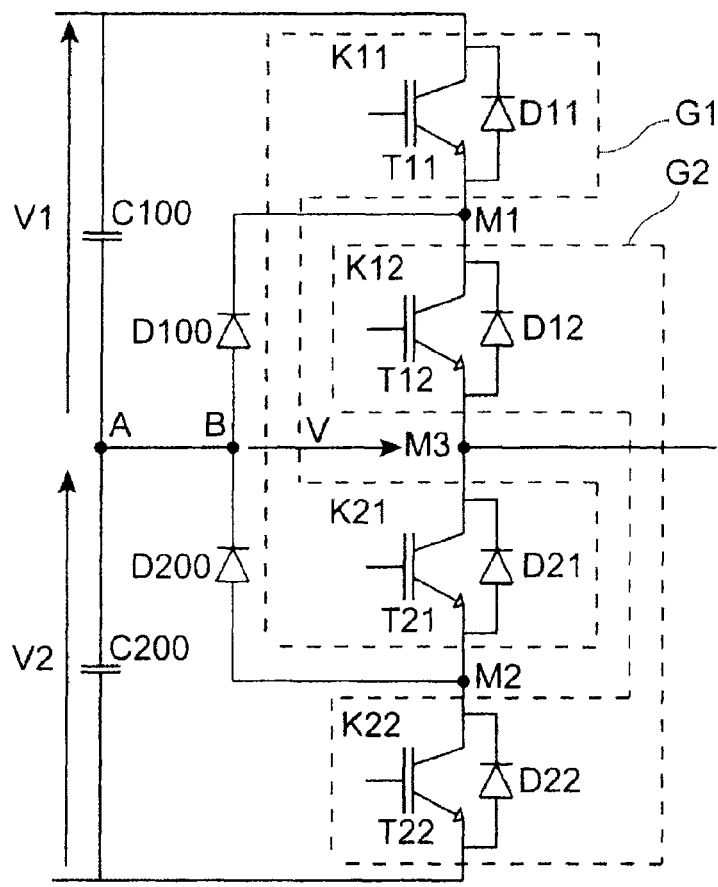
FIG. 2A shows a cell of NPC type of the multi-level converter which is the subject of the invention and FIGS. 2B, 2C, 2D illustrate the flow of the current in this cell leading to the three states of the cell of NPC type.
Figure 2C:
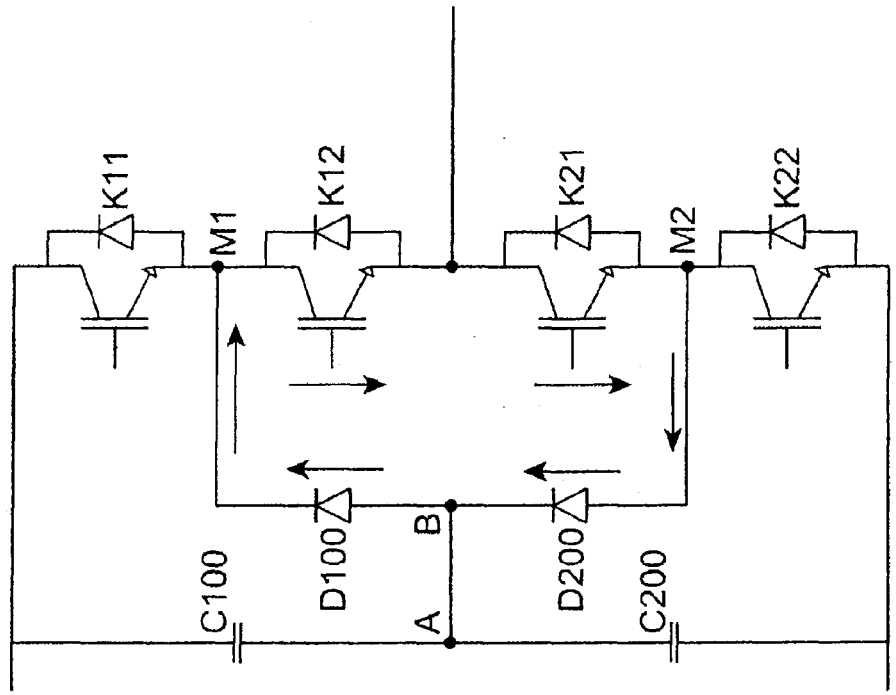
Figure 2B:
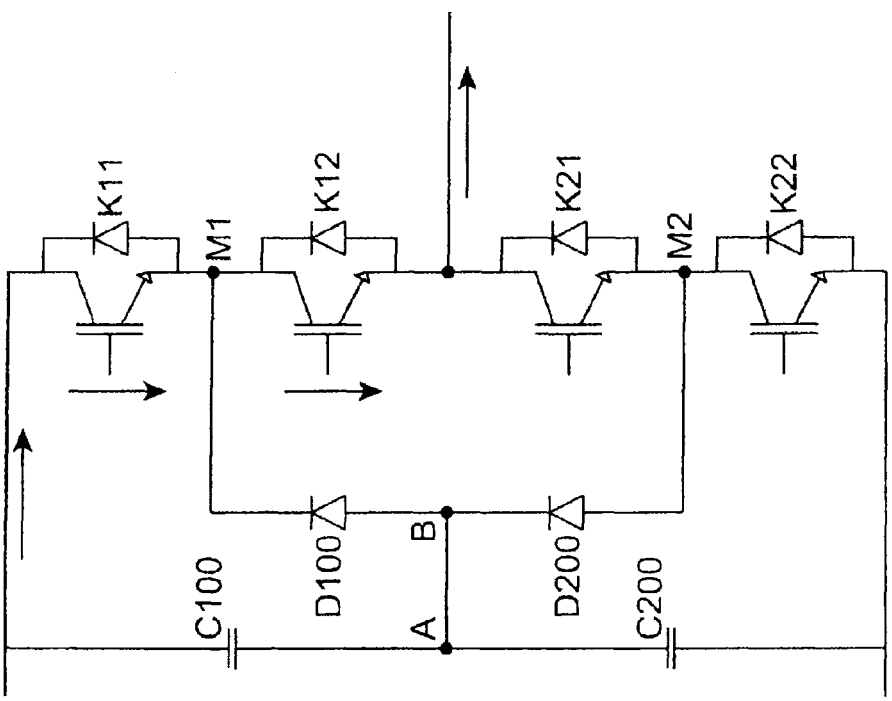
Figure 2D:
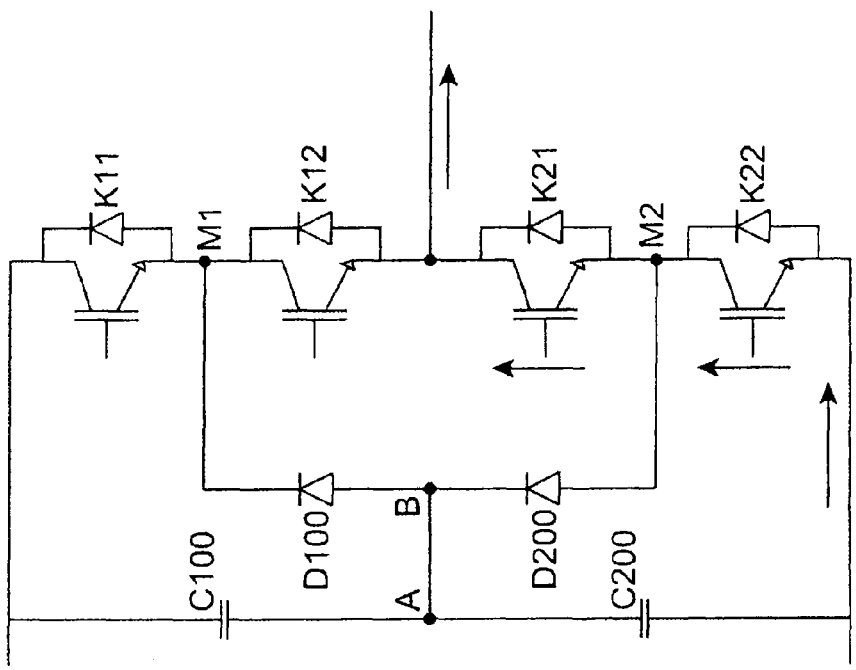

The combination K12 disabled and K11 enabled is not permitted in this setup delivering three voltage levels. State 1 is illustrated in FIG. 2B, state 2 is illustrated in FIG. 2C, state 3 is illustrated in FIG. 2D.

The structure of a floating capacitor type cell with three voltage levels will swiftly be described while referring to FIGS. 3A to 3E.

This cell of floating capacitor type comprises a quadruplet of elementary switches mounted in series dubbed K110, K120, K210, K220. In this quadruplet, a first elementary switch K110 and a second elementary switch K220 are in the extreme position and a first elementary switch K120 and a second elementary switch K210 are in the median position, and the two elementary switches K120, K210 in the median position are linked directly to one another at the node M30. In the quadruplet, an elementary switch in the extreme position is linked directly to an elementary switch in the median position. This link makes it possible to define a first midpoint M10 between the first elementary switch K110 in the extreme position and the first elementary switch K120 in the median position and a second midpoint M20 between the second elementary switch K220 in the extreme position and the second elementary switch K210 in the median position.

These elementary switches K110, K120, K210, K220 are semi-conductor switches and each comprise a controllable electronic power switch T110, T120, T210, T220, such as an IGBT (Insulated Gate Bipolar Transistor) power transistor for example associated with a diode D110, D120, D210, D220, connected in antiparallel. Instead of IGBT transistors, other electronic power switches such as MOSFET transistors or the like are conceivable.

An energy storage device C101 is connected between the first midpoint M10 and the second midpoint M20.

Two switching functions are defined. The first switching function F10 is used for the control of a first elementary switching cell J1 comprising the first elementary switch K110 in the extreme position and the second elementary switch in the extreme position K220. The second switching function F20 is used for the control of a second elementary switching cell J2 comprising the first elementary switch K120 in the median position and the second elementary switch K210 in the median position. The elementary switches of one and the same elementary switching cell are always in complementary states, enabled or disabled.

The input voltage Ve is the voltage across the terminals of the quadruplet of switches K110, K120, K210, K220. The output voltage V is the voltage across the terminals of the assembly formed by the second elementary switch K210 in the intermediate position and the second elementary switch K220 in the extreme position.

| State | K110 | K220 | F10 J1 | K120 | K210 | F20 J2 | V |
|---|---|---|---|---|---|---|---|
| 1 | enabled | disabled | 1 | enabled | disabled | 1 | Ve |
| 2 | enabled | disabled | 1 | disabled | enabled | 0 | Ve/2 |
| 3 | disabled | enabled | 0 | enabled | disabled | 1 | Ve/2 |
| 4 | disabled | enabled | 0 | disabled | enabled | 0 | 0 |

Figure 3C:
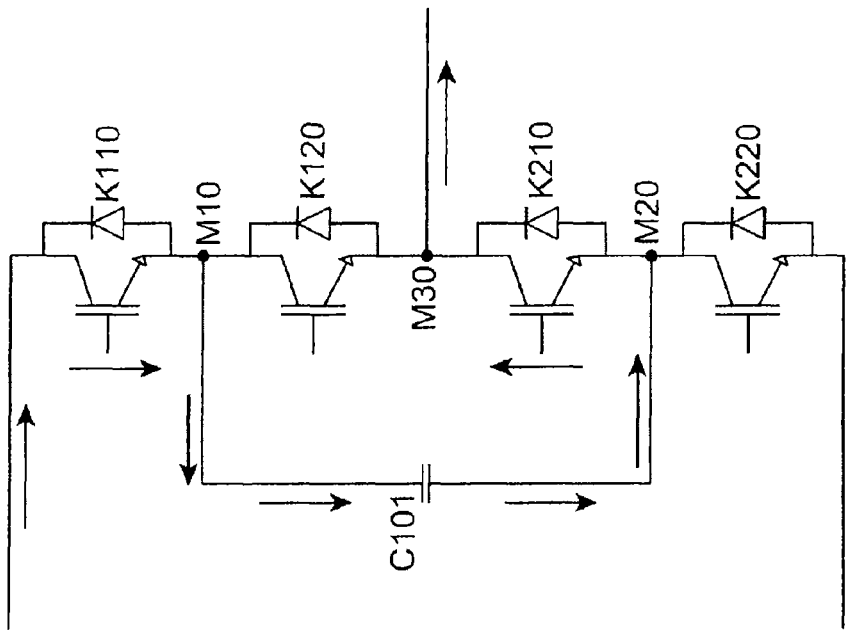
Figure 3B:
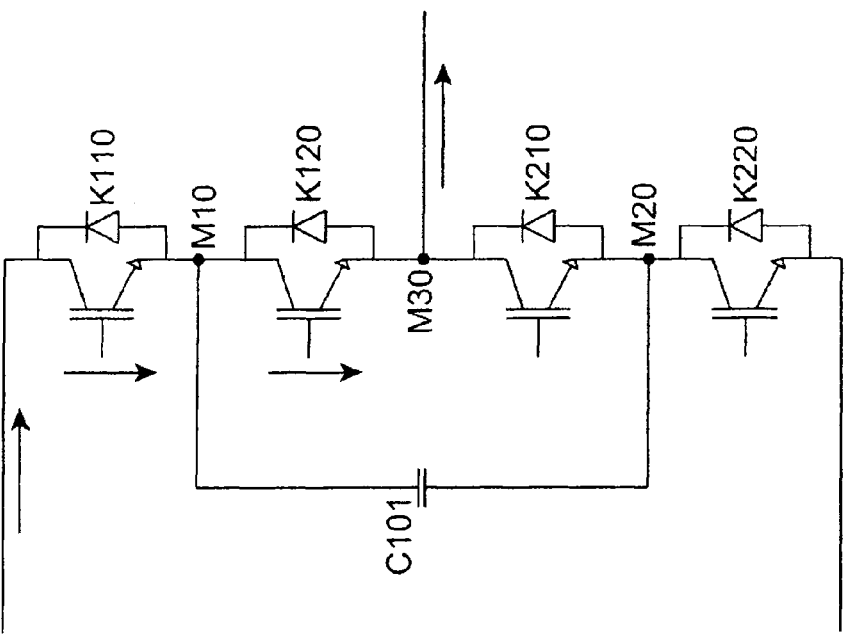
Figure 3E:
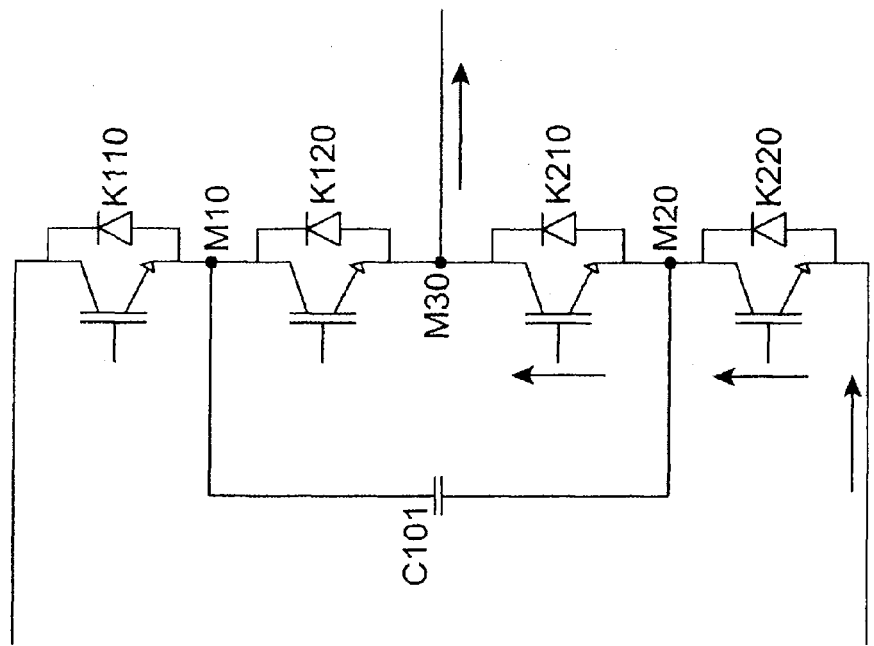
Figure 3D:
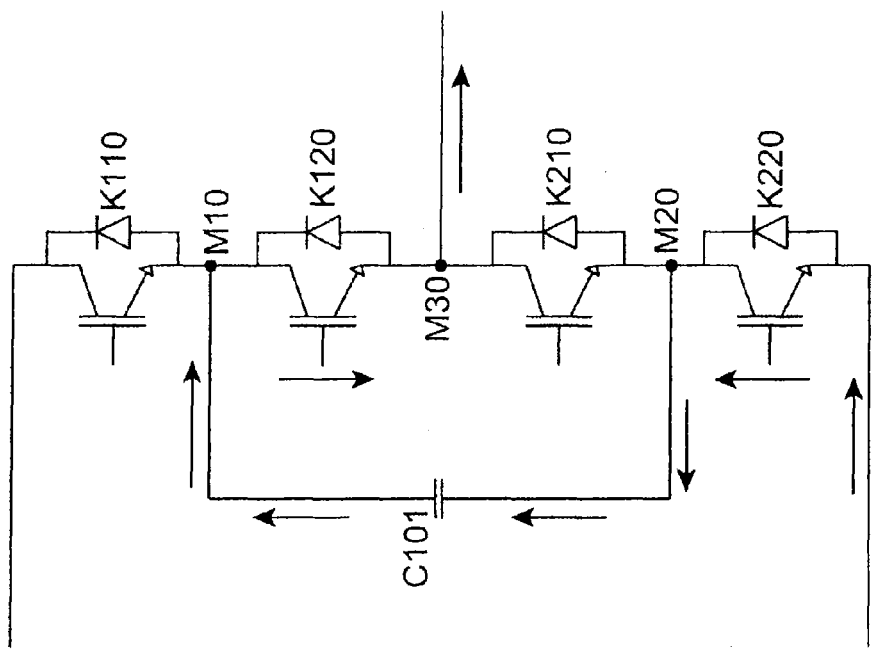

Depending on the state of the elementary switches, the three output voltage levels which can be obtained are: 0, Ve/2, Ve. State 1 is illustrated in FIG. 3B, state 2 is illustrated in FIG. 3C, state 3 is illustrated in FIG. 3D and state 4 is illustrated in FIG. 3E.

The elementary switches of the cells described above are bidirectional in current, thereby rendering the converter which is the subject of the invention reversible.

Figure 4A:
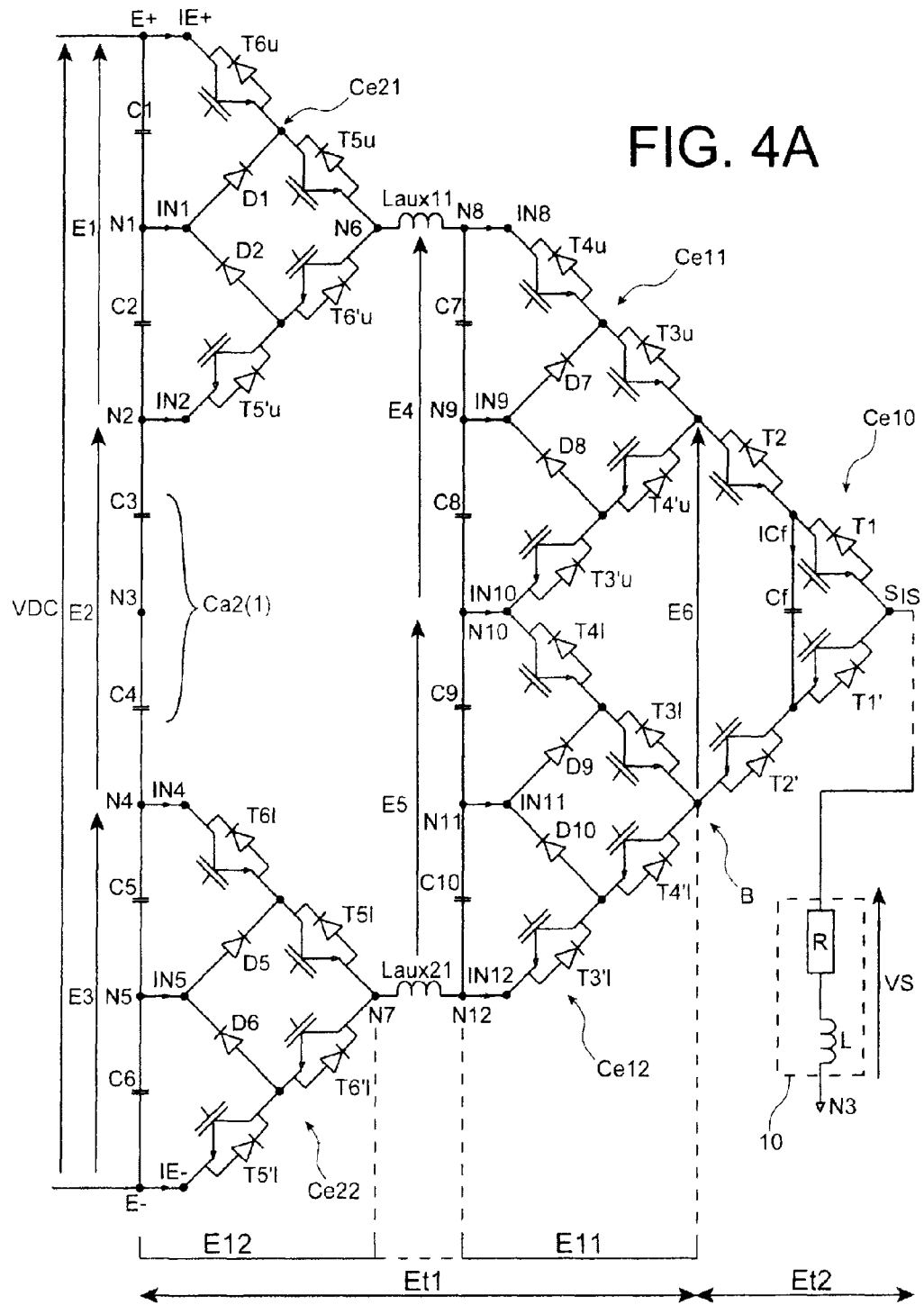
FIGS. 4A and 4B illustrate examples of a multi-level converter arm which is the subject of the invention in which the first stage is a cascade of two first elementary stages, FIG. 4A relates to an inverter and FIG. 4B relates to a rectifier.
Figure 4B:
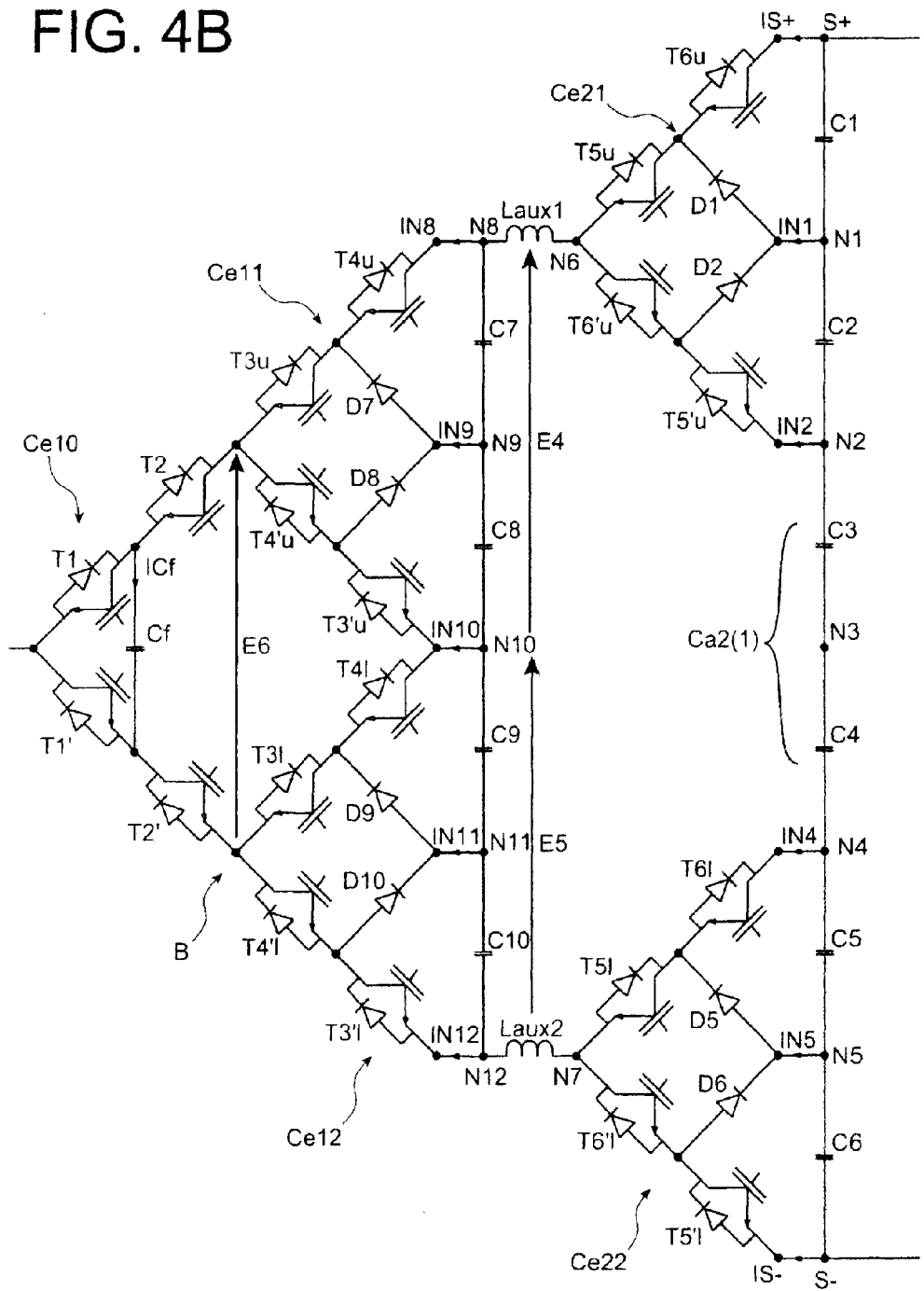

We now turn to FIGS. 4A, 4B which show in a more detailed manner the electrical diagram of an arm of a multi-level converter which is the subject of the invention. In FIG. 4A, the converter which is the subject of the invention operates as a DC/AC inverter. Its AC side output is intended to power a load 10, represented, formed of a resistor R and of an inductor L in series and equivalent to a current source. In FIG. 4B, the converter which is the subject of the invention operates as an AC/DC rectifier. The energy storage devices have been called capacitors. This is not limiting.

In this example the first stage Et1 of the arm comprises only n=2 elementary stages E11, E12 of ranks 1 and 2. The first elementary stage E11 comprises two cells of NPC type Ce11 and Ce12. The cell of NPC type Ce11 comprises four elementary switches, two of which are extreme T4$u$, T3'$u$ and two median T3$u$, T4$u$', as well as two capacitors C7, C8 and two diodes D7, D8. These components are arranged as in FIG. 2A.

The elementary switches of the cell of NPC type Ce11 are distributed as two elementary switching cells Gr4 with T4$u$ and T4'$u$ and Gr3 with T3$u$ and T3'$u$. Thus the elementary switching cell Gr4 has a level 0 when T4$u$ is disabled and T4'$u$ is enabled and a level 1 when T4$u$ is enabled and T4'$u$ is disabled. Likewise the elementary switching cell Gr3 has a level 0 when T3$u$ is disabled and T3'$u$ is enabled and a level 1 when T3$u$ is enabled and T3'$u$ is disabled.

In a similar manner, the cell of NPC type Ce12 comprises four elementary switches, two of which are extreme T4$l$, T3'$l$ and two median T3$l$, T4'$l$, as well as two capacitors C9, C10 and two diodes D9, D10. These components are arranged as in FIG. 2A.

The second elementary stage E12 comprises two cells of NPC type Ce21 and Ce22 and a capacitive cell Ca2(1) formed of a pair of capacitors in series C3 and C4. The cell of NPC type Ce21 comprises four elementary switches, two of which are extreme T6$u$, T5'$u$ and two median T5$u$, T6'$u$, two capacitors C1, C2 and two diodes D1, D2. These components are arranged as in FIG. 2A.

The elementary switches of the cell of NPC type Ce21 are distributed as two elementary switching cells Gr5 with T5$u$ and T5'$u$, and Gr6 with T6$u$ and T6'$u$. Thus the elementary switching cell Gr5 has a level 0 when T5$u$ is disabled and T5'$u$ is enabled and a level 1 when T5$u$ is enabled and T5'$u$ is disabled. Thus the elementary switching cell Gr6 has a level 0 when T6$u$ is disabled and T6'$u$ is enabled and a level 1 when T6$u$ is enabled and T6'$u$ is disabled. The elementary switching cells belonging to NPC cells of one and the same elementary stage have one and the same conversion function.

In a similar manner, the cell of NPC type Ce22 comprises four elementary switches, two of which are extreme T6$l$, T5'$l$ and two median T5$l$, T6'$l$, two capacitors C5, C6 and two diodes D5, D6.

In order to comply with the previously stated constraints, in one and the same elementary stage, the controls of the homologous elementary switches T3$u$ and T3$l$; T4$u$ and T4$l$; T5$u$ and T5$l$; T6$u$ and T6$l$ are identical. By homologous elementary switches is meant two elementary switches each belonging to a different cell of NPC type of the same elementary stage and occupying exactly the same position in said cell.

The first elementary stage E11 and the second elementary stage E12 are linked together by the two inductors Laux11, Laux21.

The second stage Et2 comprises a floating capacitor type cell Ce10 such as illustrated in FIG. 2B. The cell Ce10 comprises four elementary switches, two of which are extreme T2, T2' and two median T1, T1', as well as a capacitor Cf. These elementary switches are distributed as two elementary switching cells Gr1 with T1 and T1', and Gr2 with T2 and T2'. Thus the elementary switching cell Gr1 has a level 0 when T1 is disabled and T1' is enabled and a level 1 when T1 is enabled and T1' is disabled. Thus the elementary switching cell Gr2 has a level 0 when T2 is disabled and T2' is enabled and a level 1 when T2 is enabled and T2' is disabled.

The dimensioning of the capacitor Cf of the floating capacitor type cell does not conform to the same rules as those of the capacitors of the cells of NPC type. On the other hand, the voltage withstand of all these capacitors of the converter is the same. To simplify, the value of the capacitor Cf of the cell with nested capacitor depends on the switching frequency of the elementary switches of said cell. The value of the capacitors of a cell of NPC type is guided by the frequency of the output signal of said cell.

A load 10 of type R, L to be wired up between the node S and the node N3 has been represented. The node S is located at the common point between the two median elementary switches T1, T1' of the floating capacitor type cell Ce10. In the example of FIG. 4A, this node S corresponds to the output of the arm B in DC/AC converter operation. The node N3 is located at the common point between the two capacitors C3, C4 of the pair of capacitors of the capacitive cell Ca2(1). This node N3 corresponds to the midpoint of the input voltage source VDC.

The converter arm of FIG. 4B will not be described in greater detail. It has the same structure as that of FIG. 4A with the exception of the fact that the node S which corresponded to the output in FIG. 4A is now called node E since it now corresponds to the input. It is intended to be connected to an alternating current source (not represented). Likewise the input terminals E+, E− in FIG. 4A across whose terminals the voltage source VDC is to be wired up are now called S+ and S− in FIG. 4B, they correspond to the output of the converter and are intended to power a direct voltage source (not represented). In rectifier operation, a current IE flows from the node E to the output terminals S+ and S− whereas in inverter operation currents IE+ and IE− flowed from the terminals E+, E− to the node S. In rectifier operation currents IS+ and IS− appearing at the terminals S+ and S− are output currents, and in inverter operation the output current called Is appears at the node S.

The converter of FIG. 4A makes it possible to obtain at output 7 different voltage levels 0, VDC/6, 2VDC/6, 3VDC/6, 4VDC/6, 5VDC/6, VDC and 36 states as a function of the level of the elementary switching cells Gr1 to Gr6, that is to say of the enabled or disabled state of their elementary switches.

The 36 different and permitted states, as well as the corresponding voltage levels Vat the output of the second stage Et2, have been grouped together in the following table. The voltage V is taken between the node S and the terminal E−.

The harmonic content of the output voltage is noticeably reduced.

| State | Gr6 | Gr5 | Gr4 | Gr3 | Gr2 | Gr1 | V |
|---|---|---|---|---|---|---|---|
| 1 | 0 | 0 | 0 | 0 | 0 | 0 | 0 |
| 2 | 0 | 0 | 0 | 0 | 0 | 1 | VDC/6 |
| 3 | 0 | 0 | 0 | 0 | 1 | 0 | VDC/6 |
| 4 | 0 | 0 | 0 | 0 | 1 | 1 | 2VDC/6 |
| 5 | 0 | 0 | 0 | 1 | 0 | 0 | VDC/6 |
| 6 | 0 | 0 | 0 | 1 | 0 | 1 | 2VDC/6 |
| 7 | 0 | 0 | 0 | 1 | 1 | 0 | 2VDC/6 |
| 8 | 0 | 0 | 0 | 1 | 1 | 1 | 3VDC/6 |
| 9 | 0 | 0 | 1 | 1 | 0 | 0 | 2VDC/6 |
| 10 | 0 | 0 | 1 | 1 | 0 | 1 | 3VDC/6 |
| 11 | 0 | 0 | 1 | 1 | 1 | 0 | 3VDC/6 |
| 12 | 0 | 0 | 1 | 1 | 1 | 1 | 4VDC/6 |
| 13 | 0 | 1 | 0 | 0 | 0 | 0 | VDC/6 |
| 14 | 0 | 1 | 0 | 0 | 0 | 1 | 2VDC/6 |
| 15 | 0 | 1 | 0 | 0 | 1 | 0 | 2VDC/6 |
| 16 | 0 | 1 | 0 | 0 | 1 | 1 | 3VDC/6 |
| 17 | 0 | 1 | 0 | 1 | 0 | 0 | 2VDC/6 |
| 18 | 0 | 1 | 0 | 1 | 0 | 1 | 3VDC/6 |
| 19 | 0 | 1 | 0 | 1 | 1 | 0 | 3VDC/6 |
| 20 | 0 | 1 | 0 | 1 | 1 | 1 | 4VDC/6 |
| 21 | 0 | 1 | 1 | 1 | 0 | 0 | 3VDC/6 |
| 22 | 0 | 1 | 1 | 1 | 0 | 1 | 4VDC/6 |
| 23 | 0 | 1 | 1 | 1 | 1 | 0 | 4VDC/6 |
| 24 | 0 | 1 | 1 | 1 | 1 | 1 | 5VDC/6 |
| 25 | 1 | 1 | 0 | 0 | 0 | 0 | 2VDC/6 |
| 26 | 1 | 1 | 0 | 0 | 0 | 1 | 3VDC/6 |
| 27 | 1 | 1 | 0 | 0 | 1 | 0 | 3VDC/6 |
| 28 | 1 | 1 | 0 | 0 | 1 | 1 | 4VDC/6 |

-continued

| State | Gr6 | Gr5 | Gr4 | Gr3 | Gr2 | Gr1 | V |
|---|---|---|---|---|---|---|---|
| 29 | 1 | 1 | 0 | 1 | 0 | 0 | 3VDC/6 |
| 30 | 1 | 1 | 0 | 1 | 0 | 1 | 4VDC/6 |
| 31 | 1 | 1 | 0 | 1 | 1 | 0 | 4VDC/6 |
| 32 | 1 | 1 | 0 | 1 | 1 | 1 | 5VDC/6 |
| 33 | 1 | 1 | 1 | 1 | 0 | 0 | 4VDC/6 |
| 34 | 1 | 1 | 1 | 1 | 0 | 1 | 5VDC/6 |
| 35 | 1 | 1 | 1 | 1 | 1 | 0 | 5VDC/6 |
| 36 | 1 | 1 | 1 | 1 | 1 | 1 | VDC |

By analysing this table, it is appreciated that several states and therefore several configurations of the elementary switches lead to one and the same voltage V. However, these redundant states can generate different effects on the energy storage devices of the converter. Thus in state 2, the current is aimed at discharging the capacitor Cf of the floating capacitor type cell Ce10, whereas in state 3, the current flows in the opposite direction, thereby leading to the charging of the capacitor Cf.

Several types of control can be used to enable or disable the elementary switches and therefore ensure conversion. A traditional control based on pulse width modulation PWM can be used. Of course, the homologous elementary switches of the two cells of NPC type of one and the same elementary stage of the first stage are controlled in the same manner.

Figure 5A:
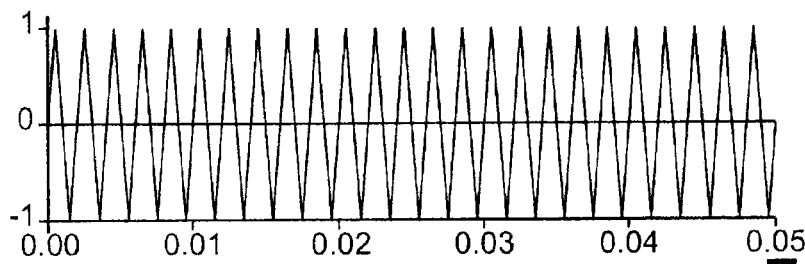
FIGS. 5A and 5B illustrate respectively triangular signals for the control of the elementary switches of the two elementary switching cells of a floating capacitor cell such as the cell Ce10 of FIG. 4A in the case of a control of pulse width modulation PWM type.
Figure 5B:
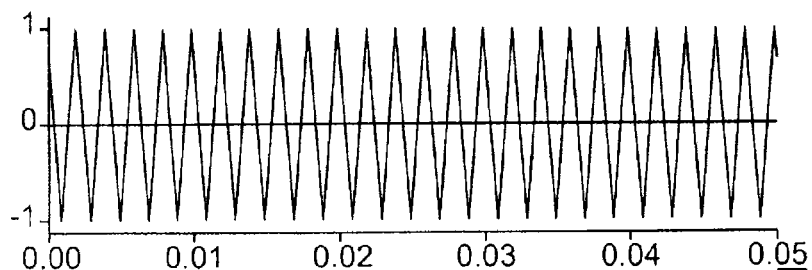

Reference is made to FIGS. 5A to 5D which show triangular carriers used to define the switching instants of the elementary switches respectively of the two cells of NPC type and of floating capacitor type of the converter which is the subject of the invention. More particularly FIGS. 5A and 5B relate, respectively, to the control of the elementary switches of the two elementary switching cells of a floating capacitor type cell such as the cell Ce10. The triangular carriers have an amplitude lying between +1 and −1. They are phase-shifted by half a switching period. For example, the triangular carrier of FIG. 5A is associated with the first elementary switching cell Gr1 and the triangular carrier of FIG. 5B is associated with the second elementary switching cell Gr2.

Figure 5C:
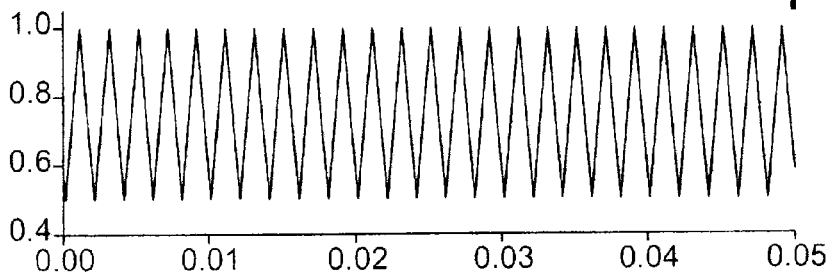
FIGS. 5C and 5D illustrate respectively triangular signals for the control of the elementary switches of the two elementary switching cells of a cell of NPC type such as the cell Ce11 of FIG. 4A in the case of a control of pulse width modulation PWM type.
Figure 5D:
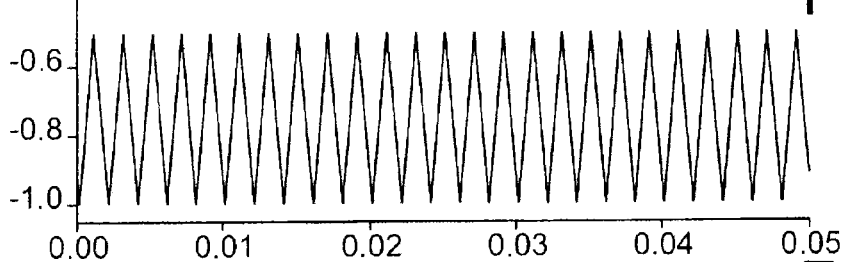

FIGS. 5C and 5D relate respectively to the control of the two elementary switching cells of a cell of NPC type such as the cells of NPC type Ce11, Ce12 for example. The triangular carriers have an amplitude lying between 0 and +1 (FIG. 5C) for the first elementary switching cell Gr3 and between −1 and 0 (FIG. 5D) for the second elementary switching cell Gr4. They are in phase. The switching instants of the elementary switches are obtained by comparison between the triangular carriers and a command signal, corresponding to the desired signal at the output of the converter. It is possible to define as rule, for example, that a switching instant of an elementary switch arises as soon as the command signal is strictly greater than the triangular carrier. It would of course have been possible to fix as rule that a switching instant of an elementary switch arises as soon as the command signal is greater than or equal to the triangular carrier.

Figure 5E:
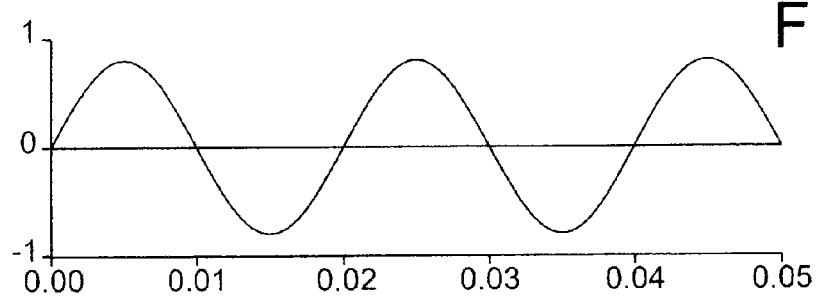
FIG. 5E illustrates a command signal to be compared with the triangular signals so as to determine switching instants of the elementary switches of the elementary switching cells.

The command signal is illustrated in FIG. 5E.

Other types of control are of course conceivable such as for example a vector control or a direct control of the pair when the converter powers a rotating machine.

An original control mode is proposed while referring to FIGS. 6 to 9. The number of setting to the enabled state of the elementary switches of the cells of NPC type of the elementary stages of the first stage during a period of the command signal Vref is limited to one. Coarse adjustment of the output voltage of said elementary stage is obtained.

By using, to control the elementary switches of the second stage of the converter, a switching frequency greater than that used to control the switches of the first stage, much finer adjustment of the output voltage of the converter is obtained, while complying with the operating constraints of each of the elementary switches. It is recalled that the switching frequency of the elementary switches is related to their technology and to their rating. In this application, it may for example lie between 500 Hz and 10000 Hz. The frequency of the signal at the output of the converter illustrated in FIG. 4A can vary between 0 and 150 Hz.

FIG. 6.00 illustrates the profile of the command signal also called the command voltage Vref which will serve in particular to determine the switching instants of all the elementary switches of the cells of NPC and floating capacitor type. It will be used in several comparisons, as will be seen subsequently. It is in phase with the voltage Vs across the terminals of the load 10 wired up at the output of the arm B, illustrated in FIG. 9.1, on the other hand the output current Is of FIG. 9.2 lags behind the command voltage. It has an amplitude of between −0.8 and +0.8 in the example described. More generally the command voltage Vref can vary between −1 and +1. The amplitude of this command voltage Vref is used to adjust the amplitude of the output voltage Vs.

FIG. 6.01 is a timechart of the carrier Car3 used with the command voltage Vref to determine the switching instants of the elementary switches T4$u$ and T3$u$ of the cell of NPC type Ce11 of the first elementary stage E11 of the converter. This is a gated signal in phase with the command voltage Vref and whose amplitude is Vref/3.

FIG. 6.1 is a timechart of the control signal for the elementary switch T3$u$ of the cell of NPC type Ce11 of the first elementary stage E11 of the converter. This is a gated signal whose period is equal to that of the command signal Vref. The elementary switch T3$u$ is disabled just once during this period, as long as the amplitude of the reference voltage Vref is less than the negative rung of the carrier Car3.

FIG. 6.2 is a timechart of the control signal for the elementary switch T4$u$ of the cell of NPC type Ce11 of the first elementary stage E11 of the converter. This is a gated signal whose period is equal to that of the command signal Vref. The elementary switch T4$u$ is enabled just once during this period, as long as the command voltage Vref is greater than the positive rung of the carrier Car3.

The elementary switches T3$u$ and T4$u$ are directly connected elementary switches in the median and extreme position, and they can have the same state as shown by the above table. This holds twice during a period.

FIG. 6.3 illustrates a timechart of the current IN8 flowing from the node N8 to the elementary switch T4$u$. The node N8 is common to the inductor Laux11 and to the elementary switch T4$u$.

FIG. 6.4 illustrates a timechart of the current IN9 flowing from the node N9 to the diodes D7 and D8. The node N9 is common to the capacitors C7, C8 and to the diodes D7 and D8.

FIG. 6.5 illustrates a timechart of the current IN10 flowing from the node N10 to the elementary switches T3'$u$ and T4$l$. The node N10 is common to the capacitors C8, C9 and to the elementary switches T3'$u$ and T4$l$.

FIG. 6.6 illustrates a timechart of the current IN11 flowing from the node N11 to the diodes D9 and D10. The node N11 is common to the capacitors C9, C10 and to the diodes D9 and D10.

FIG. 6.7 illustrates a timechart of the current IN12 flowing from the node N12 to the elementary switch T3'$l$. The node N12 is common to the inductor Laux21 and to the elementary switch T3'$l$.

FIG. 6.8 illustrates a timechart of the output current Is of the converter arm illustrated in FIG. 4A. The timecharts of FIGS. 6.3 to 6.7 represent portions of the current Is illustrated in FIG. 6.8.

FIG. 6.02 is a timechart of the carrier Car4 used with the command voltage Vref of FIG. 6.00 to determine the switching instants of the elementary switches T6$u$ and T5$u$ of the cell of NPC type Ce21 of the second elementary stage E12 of the converter. This is a gated signal in phase with the command voltage Vref and whose amplitude is 2Vref/3. The command voltage Vref has been superimposed on this timechart in bold.

FIG. 7.1 is a timechart of the control signal for the elementary switch T5$u$ of the cell of NPC type Ce21 of the second elementary stage E12 of the converter. This is a gated signal whose period is equal to that of the command signal Vref. The elementary switch T5$u$ is disabled just once during this period, as long as the amplitude of the command voltage Vref is less than the negative rung of the carrier Car4.

FIG. 7.2 is a timechart of the control signal for the elementary switch T6$u$ of the cell of NPC type Ce21 of the second elementary stage E12 of the converter. This is a gated signal whose period is equal to that of the command signal Vref. The elementary switch T6$u$ is enabled just once during this period, as long as the amplitude of the command voltage Vref is greater than the positive rung of the carrier Car4.

The elementary switches T6$u$ and T5$u$ are directly connected elementary switches in the median and extreme position, and they can have the same state as shown by the above table. This holds twice during a period.

FIG. 7.3 illustrates a timechart of the current IE+ flowing from the terminal E+, which has to be connected to the voltage source VDC, to the elementary switch T6$u$.

FIG. 7.4 illustrates a timechart of the current IN1 flowing from the node N1 to the diodes D1 and D2. The node N1 is common to the capacitors C1, C2 and to the diodes D1 and D2.

FIG. 7.5 illustrates a timechart of the current IN2 flowing from the node N2 to the elementary switch T5'$u$. The node N2 is common to the capacitors C2, C3 and to the elementary switch T5'$u$.

FIG. 7,6 illustrates a timechart of the current IN4 flowing from the node N4 to the elementary switch T6$l$. The node N4 is common to the capacitors C4, C5 and to the elementary switch T6$l$.

FIG. 7.7 illustrates a timechart of the current IN5 flowing from the node N5 to the diodes D5 and D6. The node N5 is common to the capacitors C5, C6 and to the diodes D5 and D6.

FIG. 7.8 illustrates a timechart of the current IE− flowing from the terminal E−, which has to be connected to the voltage source VDC, to the elementary switch T5'$l$.

FIG. 7.9 illustrates a timechart of the output current Is of the converter arm illustrated in FIG. 4A.

FIG. 6.03 is a timechart of the carrier Car1 used with the command voltage Vref to determine the switching instants of the elementary switch T1 of the floating capacitor type cell Ce10 of the second stage E2 of the converter. It is a triangular signal of amplitude lying between +1 and −1. The command voltage Vref is superimposed on the carrier Car1.

FIG. 6.04 is a timechart of the carrier Car2 used with the command voltage Vref to determine the switching instants of the elementary switch T2 of the floating capacitor type cell Ce10 of the second stage E2 of the converter. It is a triangular signal of amplitude lying between +1 and −1 of the same frequency but in phase opposition with respect to the carrier Car1 of FIG. 6.03. The command voltage Vref is superimposed on the carrier Car2.

FIG. 8.1 illustrates a timechart of the control signal for the elementary switch T1 of the cell Ce10 of floating capacitor type of the second stage Et2. This elementary switch T1 is enabled as long as the command voltage Vref is greater than Car1.

FIG. 8.2 illustrates a timechart of the control signal for the elementary switch T2 of the cell Ce10 of floating capacitor type of the second stage Et2. This elementary switch T2 is enabled as long as the command voltage Vref is greater than Cart.

These two control signals are gated signals at the frequency of the carriers Car1 and Car2. This frequency is much higher than that of the control signals for the elementary switches T4u, T3u, T6u, T5u of the first stage which are illustrated in FIGS. 6.1, 6.2, 7.1, 7.2 and which are at the frequency of the output current Is.

FIG. 8.3 illustrates a timechart of the current IT1 flowing from the elementary switch T2 to the elementary switch T1.

FIG. 8.4 illustrates a timechart of the current ICf flowing from the elementary switch T2 to the capacitor Cf.

FIG. 8.5 illustrates a timechart of the output current Is of the converter arm illustrated in FIG. 4A. These last three timecharts are to be compared with the timecharts of FIGS. 8.6 and 8.7 which are timecharts of the controls of the elementary switch T1 and of the elementary switch T2. The timecharts of FIGS. 8.3 to 8.7 have the same time base. The time bases of the timecharts of FIGS. 6.03, 6.04, 8.1, 8.2 have been expanded to render the switching instants of the elementary switches more visible.

FIG. 9.1 illustrates a timechart of the voltage across the terminals of the load 10 wired up at the output of the converter arm illustrated in FIG. 4A, output being effected at the node S common to the elementary switches T1 and T1' of the cell Ce10.

FIG. 9.2 illustrates a timechart of the output current Is flowing in the load 10 wired up at the output of the converter arm illustrated in FIG. 4A.

It may be noted that the voltage illustrated in FIG. 9.1 is centred on 0V, and its amplitude goes from −3000V to +3000V. The seven voltage levels are clearly visible. The voltage varies by rungs of 1000V. The values mentioned in the previous table are all positive, and there is a shift of VDC/2 between these magnitudes. For the simulation from which the timecharts ensue, the resistance of the load 10 equals 10 ohms, the inductance equals 300 mH, thereby leading to a maximum current of 30 A for an effective value of 20 A.

Referring to FIG. 10, a variable speed drive has been represented which comprises in cascade a converter 1 which is the subject of the invention operating as an AC/DC rectifier and a converter 2 which is the subject of the invention operating as a DC/AC inverter while placing between the two, DC side, a voltage source 3 such as an energy storage device. The rectifier 1 is intended to be connected at input to an alternating electrical power supply network Re that may be regarded as a current source. The inverter 2 is intended to be connected at output to a user device that may be regarded as a current source such as an AC motor M. FIG. 10 illustrates an example where the two converters 1 and 2 are three-phase. They would each comprise three arms such as those represented in FIGS. 4A, 4B.

The multi-level converter which is the subject of the invention is much more compact and lightweight than the converters of the prior art with transformer. It is much easier to install and to transport. It can be used with or without an isolation transformer. It can be plugged directly into the alternating network for AC/DC rectifier operation. It allows minimization of the harmonic pollution of the electrical network and the correction of the power factor by associating it with a regenerative active rectifier. The converter which is the subject of the invention is compatible with the alternating network up to 13.8 kV, whether it is operating as an inverter or a rectifier. Therefore, it is not compulsory to use a voltage level matching transformer, a conventionally used solution.

The DC/AC converter which is the subject of the invention can be used to power banks of asynchronous or synchronous motors, be they new or existing.

The converter which is the subject of the invention has a modular structure by virtue of employing cells of NPC and floating capacitor type and capacitive cells. It follows from this that maintenance expenditure is reduced and that reliability is good.

The load's power supply waveform is of good quality and the current source side overvoltages are limited and are related only to the linking cables.

The common DC bus can serve to power several converters which is the subject of the invention.

Another advantage of the converter which is the subject of the invention is that it does not have a low-frequency operating limit as is the case for the converters of MMC (Modular Multi-level Converter) topology used in transmissions in high-voltage energy networks.

The invention claimed is:

1. A multi-level converter comprising:
a plurality of arms configured to each be connected between a voltage source and a current source;
each arm including two stages connected in cascade with a first stage to be connected to the voltage source, a second stage to be connected to the current source,
the first stage including n elementary stages of rank one to n (n greater than one) connected in cascade, an elementary stage of rank one being connected to the second stage and an elementary stage of rank n being connected to the voltage source,
wherein each elementary stage comprises a pair of identical cells of a neutral point clamped (NPC) type connected in series, outputs of the cells of the NPC type being directly connected in series in the elementary stage of rank one, the cells of the NPC type being connected via n−1 capacitive cells for each elementary stage of rank n (n greater than one), the second stage including a cell of floating capacitor type, and each arm being connected to another arm via inductors.

2. The multi-level converter according to claim 1, wherein a capacitive cell comprises two energy storage devices arranged in series, these energy storage devices having a same energy storage capacity.

3. The multi-level converter according to claim 2, wherein, in an elementary stage, the cells of NPC type include a capacitive bridge with two energy storage devices having one and the same energy storage capacity, and each energy storage device of a capacitive cell of this elementary stage has a same energy storage capacity as one of the energy storage devices of a cell of NPC type.

4. The multi-level converter according to claim 3, wherein all the energy storage devices of the first stage have a same energy storage capacity.

5. The multi-level converter according to claim 1, wherein at least one of the cells of NPC type of an elementary stage is connected to a cell of NPC type of a neighbouring elementary stage via an inductance.

6. The multi-level converter according to claim 1, wherein a cell of NPC type includes a quadruplet of elementary switches arranged in series, two of which are in an extreme position and two of which are in a median position, an elementary switch in the extreme position and an elementary switch in the median position which are not directly linked always being in complementary states, one being enabled and the other being disabled, the two elementary switches forming an elementary switching cell.

7. The multi-level converter according to claim 6, wherein each cell of NPC type possesses a conversion function which relates the voltage applied at the input of said cell to the voltage present at the output of said cell and the two elementary switching cells of said cell also possess a conversion function.

8. The multi-level converter according to claim 7, in which the cells of NPC type of a same elementary stage have a same conversion function.

9. The multi-level converter according to claim 1, wherein a switching cell of floating capacitor type includes a quadruplet of elementary switches arranged in series, two elementary switches being in an extreme position and two elementary switches being in a median position, and the two elementary switches in the extreme position are always in complementary states and the two elementary switches in the median position are always in complementary states, one being enabled and the other being disabled.

10. The multi-level converter according to claim 6, wherein in the two cells of NPC type of a same elementary stage, homologous elementary switches are identically controlled.

11. The multi-level converter according to claim 6, wherein the elementary switches each include a controllable electronic power switch associated with a diode connected in antiparallel.

12. The multi-level converter according to claim 2, wherein the energy storage devices are chosen from among a capacitor, a battery, a fuel cell.

13. A variable speed drive comprising a cascade with a converter according to claim 1 operating as an AC/DC rectifier and a converter operating as a DC/AC inverter, linked together by their sides continuously by way of a voltage source.

* * * * *